United States Patent [19]

Sloan

[11] 4,218,152

[45] Aug. 19, 1980

[54] ELECTRIC RESIST WAX PEN

[76] Inventor: Leila C. Sloan, 212 Weiders La., Emmaus, Pa. 18049

[21] Appl. No.: 974,219

[22] Filed: Dec. 28, 1978

[51] Int. Cl.³ .............................................. A46B 11/08
[52] U.S. Cl. ........................................ 401/2; 401/265
[58] Field of Search ....................... 401/1, 2, 265, 259

[56] References Cited

U.S. PATENT DOCUMENTS

| 2,171,486 | 8/1939 | Van Fleet | 401/2 |
| 3,655,291 | 4/1972 | Volker | 401/265 |
| 3,876,857 | 4/1975 | Dhillon | 401/2 X |

FOREIGN PATENT DOCUMENTS

| 566184 | 11/1923 | France | 401/1 |
| 248832 | 2/1926 | Italy | 401/2 |

Primary Examiner—John D. Yasko
Attorney, Agent, or Firm—Ruth Moyerman

[57] ABSTRACT

An electric hand-held resist pen with an improved font and holder is disclosed. The font holder includes arcuate prongs for slidably engaging the font. By sliding the font up and down in the font holder, the heat eminating from the resistance heat to the font to its contained materials is varied and, thus, the flow rate of the material from the pen is controlled.

4 Claims, 3 Drawing Figures

ELECTRIC RESIST WAX PEN

BACKGROUND OF THE INVENTION

FIELD OF THE INVENTION

An electric hand-held wax resist pen, more particularly a resist pen used for controlled fine line decorative work or for depositing materials held in wax solution on surfaces of ceramic ware to prevent flowing together of glazes of different color during firing processes is disclosed.

SUMMARY OF THE INVENTION

Though this tool was originally intended exclusively as a ceramic tool, it is applicable to most crafts. The tool is an improvement over any prior existing tool of similar design and function. May be energized by 1½ volt dry cell ignition battery or by means of a 1½ or 2 volt transformer (that is not part of this patent application).

The tool is totally convertible to either energy source for more economical use. Battery hookup is 100% safe in the hands of a child or any person with a heart pacemaker who would not be able to use the tool were it operating on house current.

The invention incorporates a unique temperature control adjustment which further will be shown as an advantage in utilizing more than the ordinary waxes or thermoplastic materials, previously used with tools of this nature.

The following attributes of this tool are improvements on any other previously designed for this purpose: the conservation or minimal use of parts, simplifies rather than complicates the manufacture of the tool. The fact that the regulation of the heat is a simple method of sliding the font up or down between the prongs holding it enabling the user to utilize a range of materials from the normal beeswax composition used for wax resist work to lower melting temperature waxes, pitch, tar or asphaltum for certain acid resist manners of decorating, etching or generally eating away of background for producing stamping blocks, etc. The fact that the tool may be energized by several different means and the low voltage requirement of the tool makes a considerable difference in this day of economizing natural resources, the uncomplicating and inexpensive materials upon which the tool is dependent for its manufacture keeping the price at a reasonable enough range to suit any consumer. The ease with which any part or parts of this tool may be replaced when found faulty, the addition of a chemical or metallic substance to the heating device making it unnecessary to utilize more current but reaching the desired temperature by means of the metallic substance further claiming that though the heat reached may be intense enough to melt the materials inside, they are at no time sufficiently hot enough to be a danger to the user inasmuch as they will not burn the skin if contact were to be made between any of the heated parts of the tool. It is hot enough, however, to cause instant impulse to withdraw. It is further claimed that when proper adjustment of the temperature is made materials inside are completely under control and will not flow from the tip unless actual contact of tip on decorating surface is made by the decorator or artist. The tool also functions when not connected to any energy source as a drawing instrument to decorate leather, painted wood, paper, canvas, hardboard, testile ceramic and any semi-porous surface as long as material designed to be used with the certain technique may be mixed to the proper viscous consistence to readily pass through whatever decorating tip is used.

BRIEF DESCRIPTION OF THE DRAWING(S)

DESCRIPTION OF THE PREFERRED EMBODIMENT(S)

Figure 1:
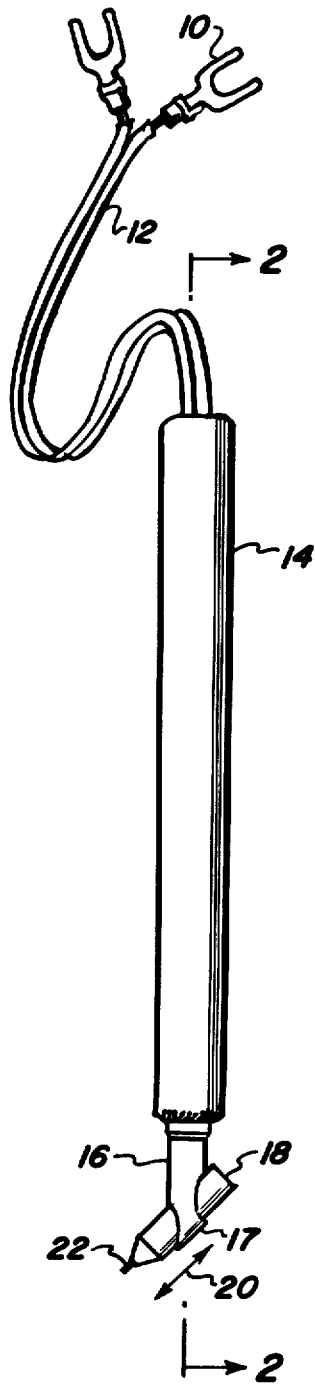
FIG. 1 shows a side elevation of the pen of this invention.
Figure 2:
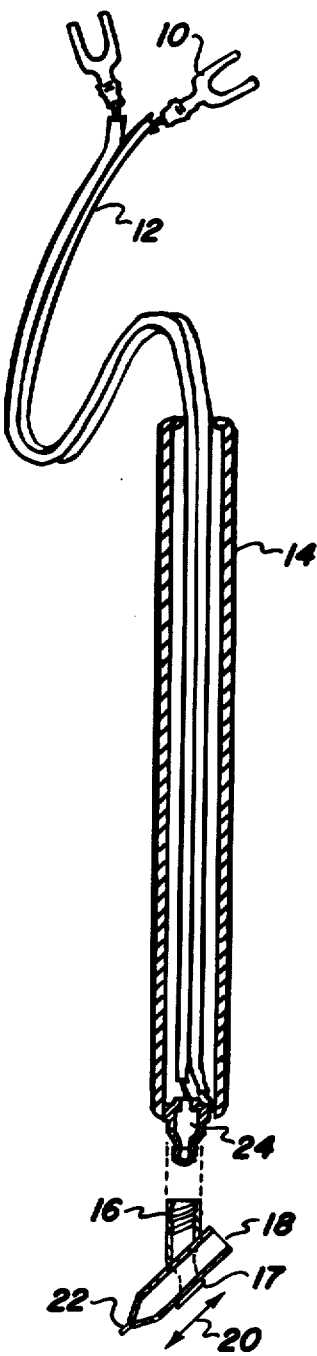
FIG. 2 shows a cross section taken on lines 2—2 of the view in FIG. 1 with font and holder disconnected from the main body.

Referring now to the drawings and more particularly to FIG. 1 and FIG. 2, 10 shows the terminals for hookup either to the battery or transformer. Terminals 10 join cord 12. Handle 14 may be represented as shown or in any stylized version so desired as long as the material used is of heat resistant substance. Suggest that these following may be considered—nylon, cork, etc.

Handle 14 terminates in removable font holding means 16. Font holding means 16 contains arcuate prongs 17 which transversly grasp font 18 in slidably engaged relationship as shown by directional arrow 20.

Referring now to FIG. 2 which shows a cross section of the view in FIG. 1, the interior of the pen including glow plug 24 used to complete our tool and make it operationally feasible is shown. The addition of a paste of manganese dioxide to the glow plug is necessary to reach the heat required to melt the materials being utilized since the function of the glow plug is not to heat but rather to illunminate.

Font holding means 16 used to secure glow plug 24 to font 18 by means of threads both male and female—male in the case of glow plug 24, female in the case of the font holding means 16.

Font 18 which houses the capillary tip 22 through which the wax passes—slips snuggly into font holding means 16 as indicated and is adjustable (arrow 20).

Figure 3:
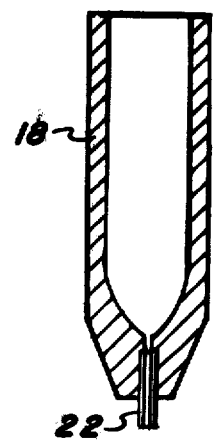
FIG. 3 shows a detailed cross section of the font portion of the pen of this invention.

Referring now to FIG. 3, font 18 includes capillary 22, a steel tube which permits the wax to flow as previously mentioned when heated to the proper temperature onto the surface being decorated. Should the decorating material or resist being used require more or less heat the font may be raised or lowered in the font holding means 16 concentrating more of the heat by radiation through the font holding means to the most desirable spot thus acting in lieu of a mechanical thermostat to melt the contents sufficiently creating the viscosity required to permit the material therein to flow controllably when placed in contact with the item being decorated. The parts of the tool e.g. glow plug 24, font holding means 16, font 18 and capillary tip 22 used for the conductivity of the heat may be brass, aluminum, copper or any other metal or alloy found to be suitable at the discretion of the manufacturer.

Should the user wish variable thicknesses of lines, there are additional fonts with variety of tips, lines and applicators that will perform many different applications.

What is claimed is:

1. Apparatus for controlling the rate of flow of molten material from the tip of an electric resist pen to a work piece comprising:

(a) a font for containing flowable material;

(b) a capillary tip passing through said font to its interior whereby material in said font may flow to said work piece; and (c) heat conducting font holding means including coupling means for connecting said font holder at one end to a resistance heat source and transverse font grasping means at said other end, said font grasping means slidably engaging said font whereby, by adjusting variable font resting positions, the amount and placement of heat transferred from holder to font is controlled, thereby controlling said flow rate of molten material from said pen.

2. The apparatus of claim 1 wherein said font grasping means comprises an arcuate prong member partially encircling said font.

3. The apparatus according to claim 1 wherein said font holding means is connected to said resistance heat source by male/female coupling.

4. The apparatus according to claim 1 wherein said font grasping means holds said font at an angular projection from said pen.

* * * * *